(12) United States Patent
Nishiwaki

(10) Patent No.: US 7,082,265 B2
(45) Date of Patent: Jul. 25, 2006

(54) ELECTRONIC DEVICE AND CAMERA

(75) Inventor: Kenya Nishiwaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/265,623

(22) Filed: Nov. 2, 2005

(65) Prior Publication Data

US 2006/0062566 A1 Mar. 23, 2006

Related U.S. Application Data

(62) Division of application No. 10/794,450, filed on Mar. 5, 2004, now Pat. No. 6,999,675.

(30) Foreign Application Priority Data

Mar. 10, 2003 (JP) ............................ 2003-063992

(51) Int. Cl.
*G03B 17/00* (2006.01)
*H01H 21/24* (2006.01)
*H01H 3/00* (2006.01)

(52) U.S. Cl. ...................... 396/85; 396/299; 396/543; 200/16 C; 200/339

(58) Field of Classification Search ............ 396/85–87, 396/131, 297–299, 502, 543; 348/240.99, 348/240.1, 240.3; 200/11 R, 11 C, 11 TW, 200/16 C, 339

See application file for complete search history.

(56) References Cited

U.S. PATENT DOCUMENTS

| 3,517,597 | A | | 6/1970 | Rauffer ........................ 396/85 |
| 3,993,881 | A | | 11/1976 | Marsilio .................. 200/16 C |
| 4,400,076 | A | * | 8/1983 | Miura et al. ................ 396/299 |
| 6,628,901 | B1 | * | 9/2003 | Naka .......................... 396/301 |

* cited by examiner

*Primary Examiner*—W. B. Perkey
(74) *Attorney, Agent, or Firm*—Cowan, Liebowitz & Latman, P.C.

(57) ABSTRACT

An electronic device comprises a terminal, an armature which can contact the terminal, a knob member which moves between a first position and a second position, sliding the armature on the terminal, a first energizing member which energizes the knob member in the direction of the first position, a rotation operation member which can move the knob member and can rotate between a third position corresponding to the first position and a fourth position corresponding to the second position, and a second energizing member which energizes the rotation operation member in the direction of the third position when the rotation operation member rotates from the third position.

7 Claims, 12 Drawing Sheets

ELECTRONIC DEVICE AND CAMERA

CROSS-REFERENCE TO RELATED APPLICATIONS

This application is a divisional of application Ser. No. 10/794,450, filed Mar. 5, 2004, now U.S. Pat. No. 6,999,675 the entire disclosure of which is hereby incorporated by reference.

BACKGROUND OF THE INVENTION

1. Field of the Invention

The present invention relates to a structure of an operation member mounted on an electronic device and a camera.

2. Description of the Related Art

There are many examples of products incorporating an electronic circuit which use a slide type knob as an operation unit for instructing operation conditions, etc., to a control circuit and use a slide switch which outputs different signals according to the moving position of the knob.

An overview of an operation switch provided in a camera will be explained using FIG. 8. In the camera shown in FIG. 8, an exterior cover 22 of a camera body 21 is provided with an operation lever 23 and a switch unit provided inside the camera body 21 is operated by moving the operation lever 23.

A detailed structure of the switch unit 24 will be explained using FIG. 9. A base member 24a is made of a resin material and provided with electrical insulation properties. A first terminal 24b and a second terminal 24c are provided in the base member 24a and the terminals 24b and 24c have conductors which extend beyond the base member 24a.

A sliding armature 24e which is formed of a metallic thin plate with spring properties, is attached to a knob member 24f formed of a resin material. When the knob member 24f is operated, the sliding armature moves together with the knob member 24f and sides on the surface of the terminals 24b and 24c. In this way, signals are output from the terminals 24b and 24c to the outside (control circuit).

A knob spring 24g forms a compression spring made of a wound spring wire member and energizes the knob member 24f toward a stationary position (rightward in FIG. 9) all the time as shown in FIG. 9. A cover member 24h covers the top surface of the base member 24a and part of the knob member 24f is exposed from a hole in the center.

In the condition shown in FIG. 9, the sliding armature 24e has contact only with the first terminal 24b and there is no electrical connection between the first terminal 24b and the second terminal 24c.

When the operator moves the operation lever 23 provided on the exterior cover 22 from a stationary position (position in FIG. 9) to an operation position in FIG. 10, an engagement lug 23a pushes the knob member 24f and moves it from the stationary position (position in FIG. 9) to the operation position (position in FIG. 10) in the direction indicated by arrow A.

In this way, the sliding armature 24e contacts the first terminal 24b and second terminal 24c and electrically connects the two terminals 24b and 24c. An electronic circuit (not shown) detects the above described electrical connection and instructs the control circuit to change operation conditions, etc.

Then, when the operator releases the operation lever 23, the knob member 24f receives the spring force of the knob spring 24g and returns from the operation position to the stationary position. And the sliding armature 24e also returns to the position repressing electrical connection between the first terminal 24b and second terminal 24c. The electronic circuit detects the condition in which there is no electrical connection and instructs the control circuit to restore the original operation condition.

On the other hand, FIG. 11 shows an example of a switch unit 25 which has two operation positions of the knob member 24f. In FIG. 11, the same members as those described above are assigned the same reference numerals. A knob spring 24i forms a compression spring made of a wound spring wire member and energizes the knob member 24f so as to return it from the second operation position to the stationary position all the time.

In the condition shown in FIG. 11, the sliding armature 24e has contact with only the first terminal 24b and does not electrically connect the terminals 24b and 24c or the terminals 24b and 24d.

Here, when the operator moves the operation lever 23 from the stationary position (position in FIG. 11) to the operation position as shown in FIG. 12, the engagement lug 23a pushes the knob member 24f in the direction indicated by arrow A, and moves the knob member 24f from the stationary position (position in FIG. 11) to a first operation position. In this way, the sliding armature 24e electrically connects the first terminal 24b and second terminal 24c.

Furthermore, when the operation lever 23 is moved to a second operation position as shown in FIG. 13, the engagement lug 23a pushes the knob member 24f in the direction indicated by arrow B, and moves the knob member 24f from the stationary position to the second operation position. Therefore, the sliding armature 24e electrically connects the first terminal 24b and third terminal 24d.

As described above, when the terminals are electrically connected, an electronic circuit (not shown) detects this condition and instructs the control circuit to change the operation condition. Then, when the operator releases the operation lever 23, the knob spring 24g or knob spring 24i causes the knob member 24f to return to the stationary position in FIG. 11. In this way, the sliding armature 24e also returns to the position repressing electrical connection between the first terminal 24b and second terminal 24c or electrical connection between the first terminal 24b and third terminal 24d. The electronic circuit detects this and instructs the control circuit to restore the original operation condition.

In the above described structure of the conventional art, the role of returning the operation lever 23 to the stationary position is assumed by the knob spring 24g (24i). However, the conventional structure alone cannot reliably return the operation lever 23 to the stationary position.

In the structure shown in FIG. 9, due to a gap between the knob member 24f and engagement lug 23a or flexure in various portions, etc., a subtle backlash occurs between the operation lever 23 and exterior cover 22.

Furthermore, even when the knob spring 24g tries to return the knob member 24f to the stationary position, friction between the sliding armature 24e and terminals 24b and 24c may repress the knob member 24f from returning to the stationary position.

Especially in the structure shown in FIG. 11, the above described problem becomes noticeable. The stationary position of the knob member 24f is a point at which a spring force F1 of the knob spring 24g and a spring force F2 of the knob spring 24g are brought into balance of "F1=F2."

If the switch unit 25 has a symmetrical structure and the knob spring 24g and knob spring 24i are identical members, the stationary position of the knob member 24f theoretically becomes the central position equidistant from both ends of the base member 24a. However, there is normally an error of approximately 10% between the forces of the knob springs 24g and 24i as the coil springs, and therefore it is difficult to make the knob springs 24g and 24i absolutely identical in reality.

Furthermore, a frictional force which is obtained by multiplying frictional coefficient μ by contact pressure N, is produced when the sliding armature 24e contacts the terminals, and the position at which the knob member 24f stops is any position within a range where (F1±10%)=(F2±10%) ±μN holds, and therefore the stationary position becomes extremely unstable.

FIG. 14 shows a relationship between a moving distance (x) of the knob member 24f and the spring force (restoring force, y) in the stationary position direction which the knob member 24f receives. In FIG. 14, the horizontal axis shows the moving distance of the knob member 24f and the vertical axis shows the restoring force generated in the knob member 24f restoring it to the stationary position.

Theoretically, the spring curve is a symmetric straight line as shown by a solid line and the knob member 24f stands still at the central position (1 point). However, due to the influence of the frictional force, etc., the restoring force actually decreases as indicated by two-dot dashed lines compared to the solid line and the stationary position of the knob member 24f falls within the range indicated by X1.

Furthermore, if there is a variation in the balance between the right and left knob springs of the knob member 24f, the central position is shifted to the right or left, and therefore the stationary position of the knob member 24f is not stable. Furthermore, a greater operation force is required as the amount of movement of the operation lever 23 increases, and therefore it is difficult to operate the operation lever 23 smoothly.

SUMMARY OF THE INVENTION

It is an object of the present invention to provide an electronic device and a camera capable of stabilizing the position of a rotation operation member and a knob member or improving the operability and the quality of the rotation operation member.

One aspect of the electronic device of the present invention comprises a terminal, an armature which can contact the terminal, a knob member which moves between a first position and a second position, sliding the armature on the terminal, a first energizing member which energizes the knob member in the direction of the first position. Furthermore, the electronic device comprises a rotation operation member which can move the knob member and can rotate between a third position corresponding to the first position and a fourth position corresponding to the second position. Furthermore, the electronic device comprises a second energizing member which energizes the rotation operation member in the direction of the third position when the rotation operation member rotates from the third position.

One aspect of the camera of the present invention is the above described electronic device. Here, the rotation operation member is a member to be operated to change the focal length of an image-taking optical system. And a pressing operation member which is provided in the rotation center of the rotation operation member and subjected to a pressing operation, is a member to be operated to start an image-taking operation.

The feature of the electronic device and the camera of the present invention will become more apparent from the following detailed description of a preferred embodiment of the invention with reference to the drawings.

DETAILED DESCRIPTION OF THE PREFERRED EMBODIMENTS

Figure 1:
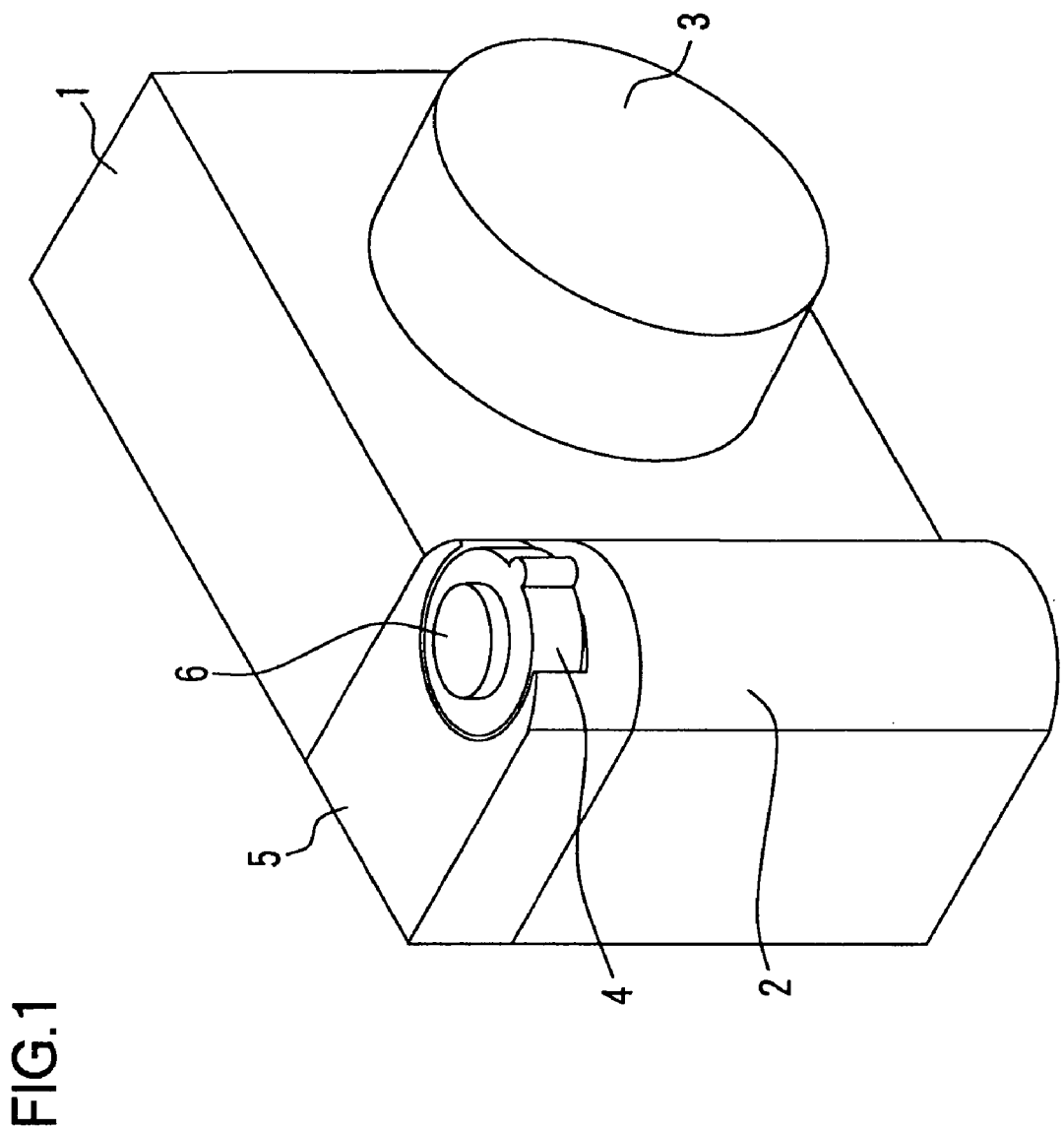
FIG. 1 is an external perspective view of a camera which is an embodiment of the present invention.

FIG. 1 is an external perspective view of a digital camera (electronic device) which is an embodiment of the present invention.

In FIG. 1, reference numeral 1 denotes a camera body in which various members which allow image-taking are provided. Reference numeral 2 denotes a grip portion to allow the photographer to hold the camera body 1. Reference numeral 3 denotes a lens barrel which protrudes and retracts in the direction of the optical axis to change the focal length of the image-taking optical system.

Reference numeral 4 denotes a zoom lever which is operated to change an image-taking angle of view (focal length of the image-taking optical system) of the lens barrel 3, formed in a substantially cylindrical shape and built in the camera body 1. The zoom lever 4 is designed to be rotatable by a predetermined amount forward or backward around a shaft.

Reference numeral 5 denotes a release button which allows a two-stage depression operation; starting an image-taking preparation operation (photometric operation and focusing operation, etc.) when half-depressed and starting an image-taking operation (exposure to light on an image-pickup element such as CCD) when full-depressed. Reference numeral 6 denotes a grip cover placed at the top of the grip portion 2.

Then, the peripheral structure of the zoom lever 4 will be explained in detail below.

Figure 2:
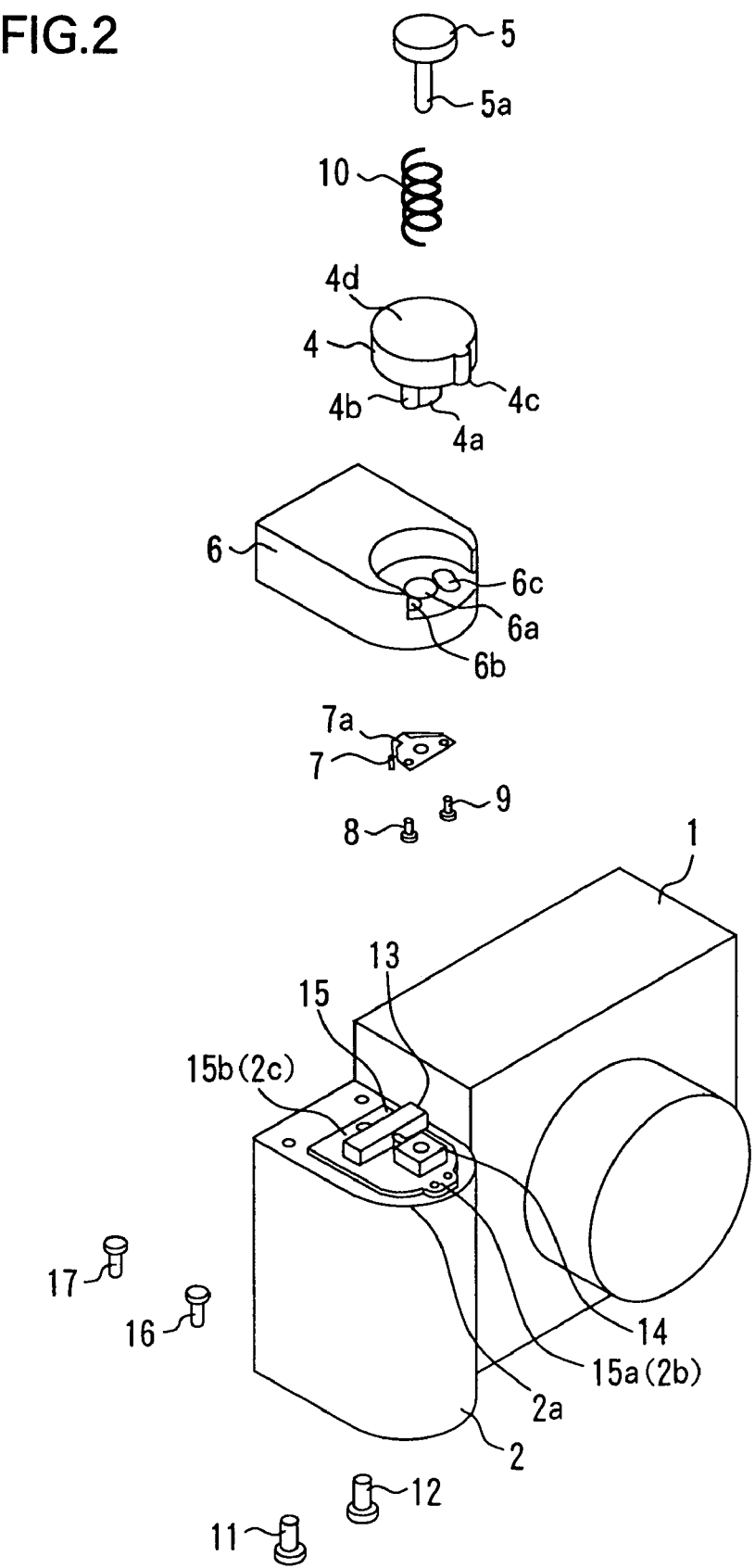
FIG. 2 is an exploded perspective view of a peripheral structure of a zoom lever.

FIG. 2 is an exploded perspective view showing the peripheral structure of the zoom lever 4.

In FIG. 2, a rotating shaft 4a of the zoom lever 4 penetrates a cover hole 6a formed in a grip cover 6, and the zoom lever 4 can thereby rotate around the rotating shaft 4a. A plate 7 made of a thin spring member is attached to the end of the rotating shaft 4a which protrudes out of the cover hole 6a.

Furthermore, mounting bosses 4b and 4c of the zoom lever 4 penetrate two long holes 6b and 6c formed in the grip cover 6. Here, the long holes 6b and 6c are formed along the cover hole 6a. Two screws 8 and 9 are attached to the end of the mounting bosses 4b and 4c which have penetrated the long holes 6b and 6c. Therefore, the plate 7 is fixed to the zoom lever 4 and the zoom lever 4 is attached to the grip cover 6.

In the above described structure, the zoom lever 4 can rotate around the rotating shaft 4a within a range in which the mounting bosses 4b and 4c can move in the long holes 6b and 6c. Here, the plate 7 can also rotate together with the zoom lever 4. Compared to a slide type structure, the above described structure of rotating the zoom lever 4 can reduce the operation range of the zoom lever 4, and therefore the camera can be miniaturized. Moreover, the external shape of the zoom lever 4 can be changed to any shape such as a dial type or arm type according to the purpose of use.

A button hole 4d is formed in the zoom lever 4, and a release button 5 together with a button spring 10 is fitted in the button hole 4d.

As described above, the grip cover 6 in which the zoom lever 4 and release button 5, etc., are fitted is mounted on a switch seat 2a formed on the top surface of the grip portion 2 and fixed by screws 11 and 12 from the back of the switch seat 2a.

Reference numeral 13 denotes a slide type zoom switch unit, 14 denotes a push type release switch unit and these switch units 13 and 14 are mounted at appropriate positions on the surface of a flexible substrate 15. One end of the flexible substrate 15 extends into the camera body 1 and is connected to a control circuit (not shown) provided inside the camera body 1.

That is, the release switch unit 14 is placed right below the rotation center of the zoom lever 4 and a button leg 5a contacts the release switch unit 14 through a pressing operation of the release button 5. Furthermore, the zoom switch unit 13 is placed close to the release switch unit 14 and operates interlocked with the plate 7.

Thus, by placing the zoom switch unit 13 close to the release switch unit 14, it is possible to effectively use a limited space of the flexible substrate 15 to arrange the two switch units 13 and 14 in a space-saving manner.

The flexible substrate 15 is fixed to the switch seat 2a using screws 16 and 17 by engaging mounting reference holes 15a and 15b with mounting reference pins 2b and 2c provided on the switch seat 2a.

Figure 3:
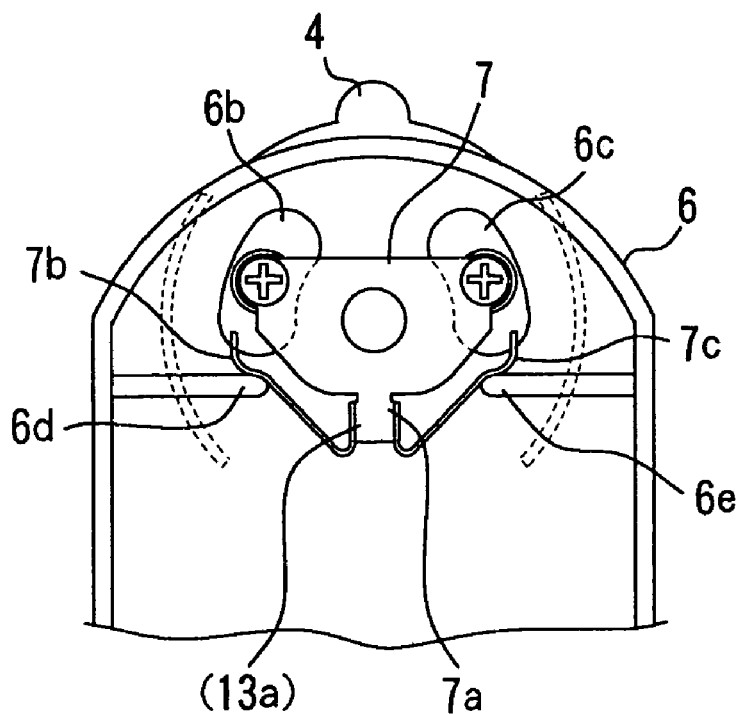
FIG. 3 is a rear view of a grip cover (stationary position)

Then, FIG. 3 shows a rear view of the grip cover 6 in which the above described parts (zoom lever 4 and plate 7, etc.) are built.

Arms 7b and 7c (the second energizing member) formed as one body with the plate 7 have spring properties and contact the ends of ribs 6d and 6e formed on the back of the grip cover 6. In the condition shown in FIG. 3, the balance between contact pressures to the ribs 6d and 6e of the arms 7b and 7c is kept even, thereby the zoom lever 4 is held at a predetermined position and kept stable.

At the root end of the arms 7b and 7c, an engagement portion 7a having a predetermined width is formed and designed to contact a knob member 13a according to the operation of the zoom lever 4. Here, the width of the engagement portion 7a is set wider than the width of the knob member 13a by an appropriate distance and provided with certain play, which makes it easier to align the knob member 13a with the engagement portion 7a when the zoom switch unit 13 is covered with the grip cover 6.

Then, the structure of the zoom switch unit 13 will be explained using FIG. 4.

Figure 4:
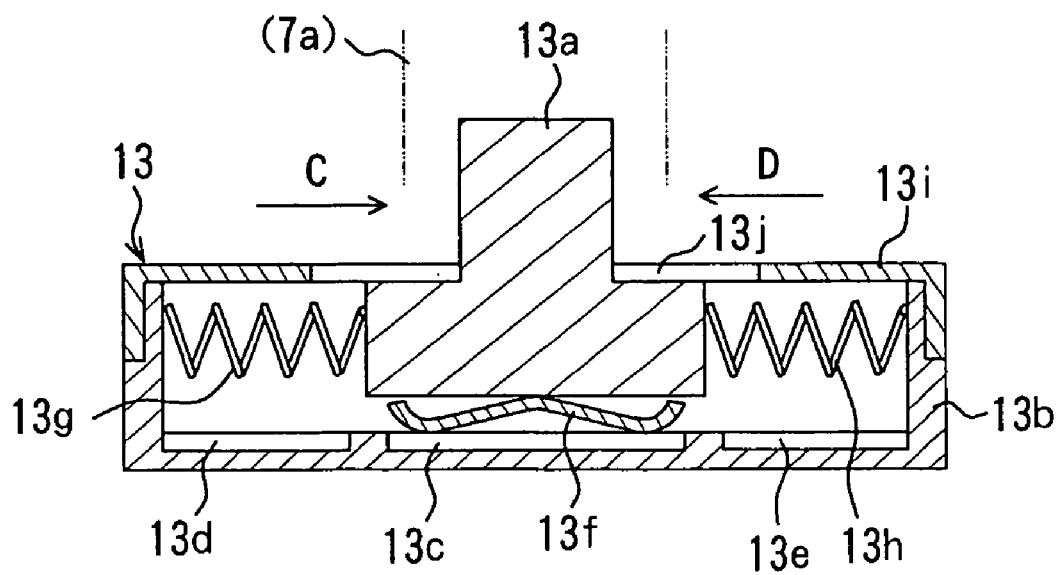
FIG. 4 shows a structure of a zoom switch (stationary position)

In FIG. 4, reference numeral 13b denotes a base member which is made of a resin material and has electrical insulation properties. Reference numerals 13c, 13d and 13e denote first, second and third terminals respectively provided in the base member 13b, which have a conductor extending beyond the base member 13b.

Reference numeral 13f denotes a sliding armature, which is formed of a metallic thin plate having spring properties and fixed to the knob member 13a made of a resin material. As the knob member 13a moves in the horizontal direction in FIG. 4, the sliding armature 13f moves together with the knob member 13a, sliding on the top surfaces of the terminals 13c to 13e.

At this time, the sliding armature 13f electrically connects the first terminal 13c and the second terminal 13d or electrically connects the first terminal 13c and the third terminal 13e according to the stop position of the sliding armature 13f, and the signal is output from the zoom switch unit 13.

Reference numeral 13g denotes a first knob spring (one of the first and third energizing member) which forms a compression spring made of a wound spring wire member and energizes the knob member 13a in the direction indicated by arrow C in FIG. 4. Reference numeral 13h denotes a second knob spring (another of the first and third energizing member) which also forms a compression spring made of a wound spring wire member as in the case of the first knob spring 13g and energized the knob member 13a in the direction indicated by arrow D in FIG. 4.

Reference numeral 13i denotes a cover member which covers the top surface of the base member 13b. A part (protrusion) of the knob member 13a protrudes out of a hole 13j formed in the center of the cover member 13i. The protrusion contacts the engagement portion 7a of the plate 7 shown by chain double-dashed line in FIG. 4.

Figure 11:
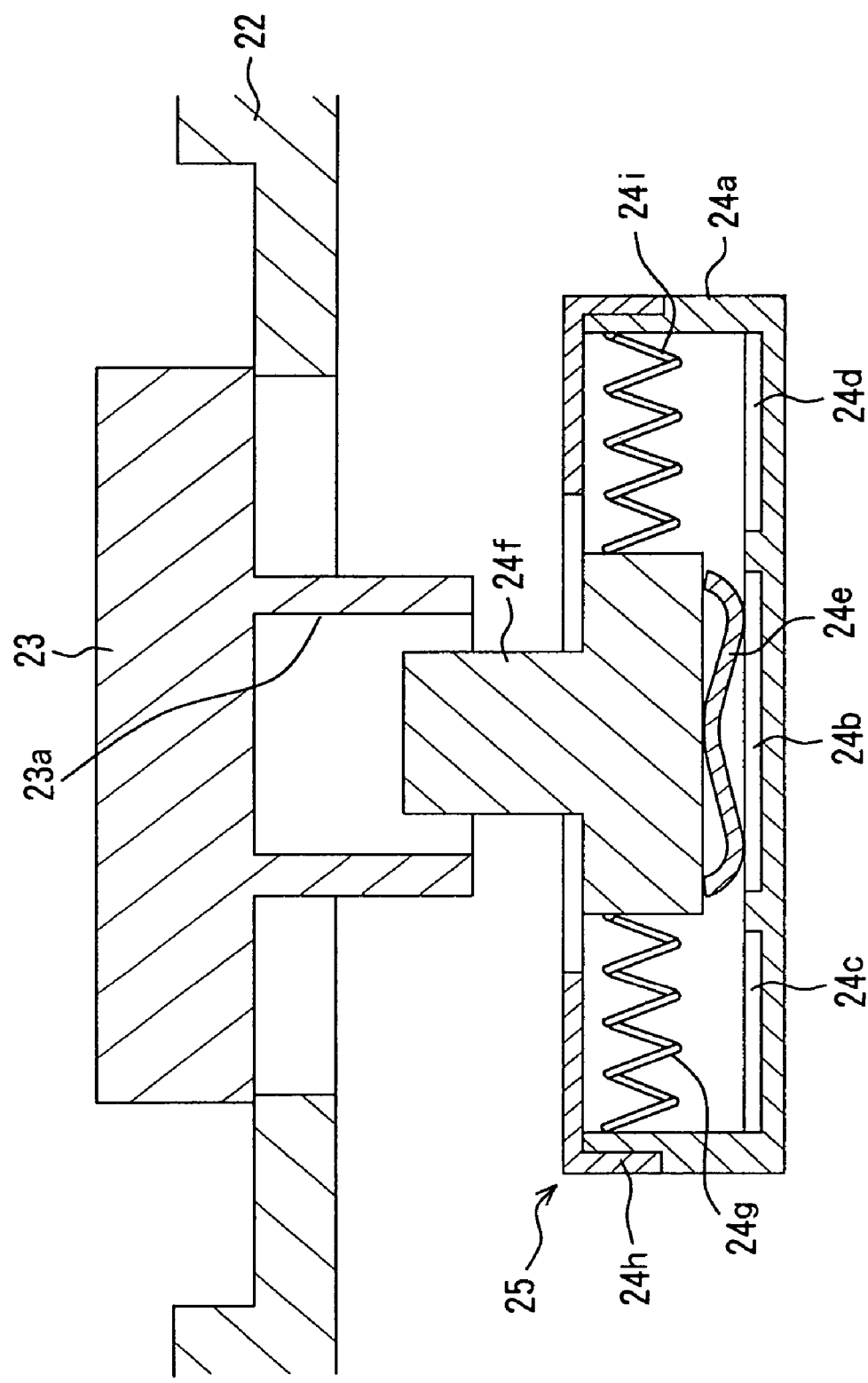
FIG. 11 shows a structure of the zoom switch of the conventional art.
Figure 12:
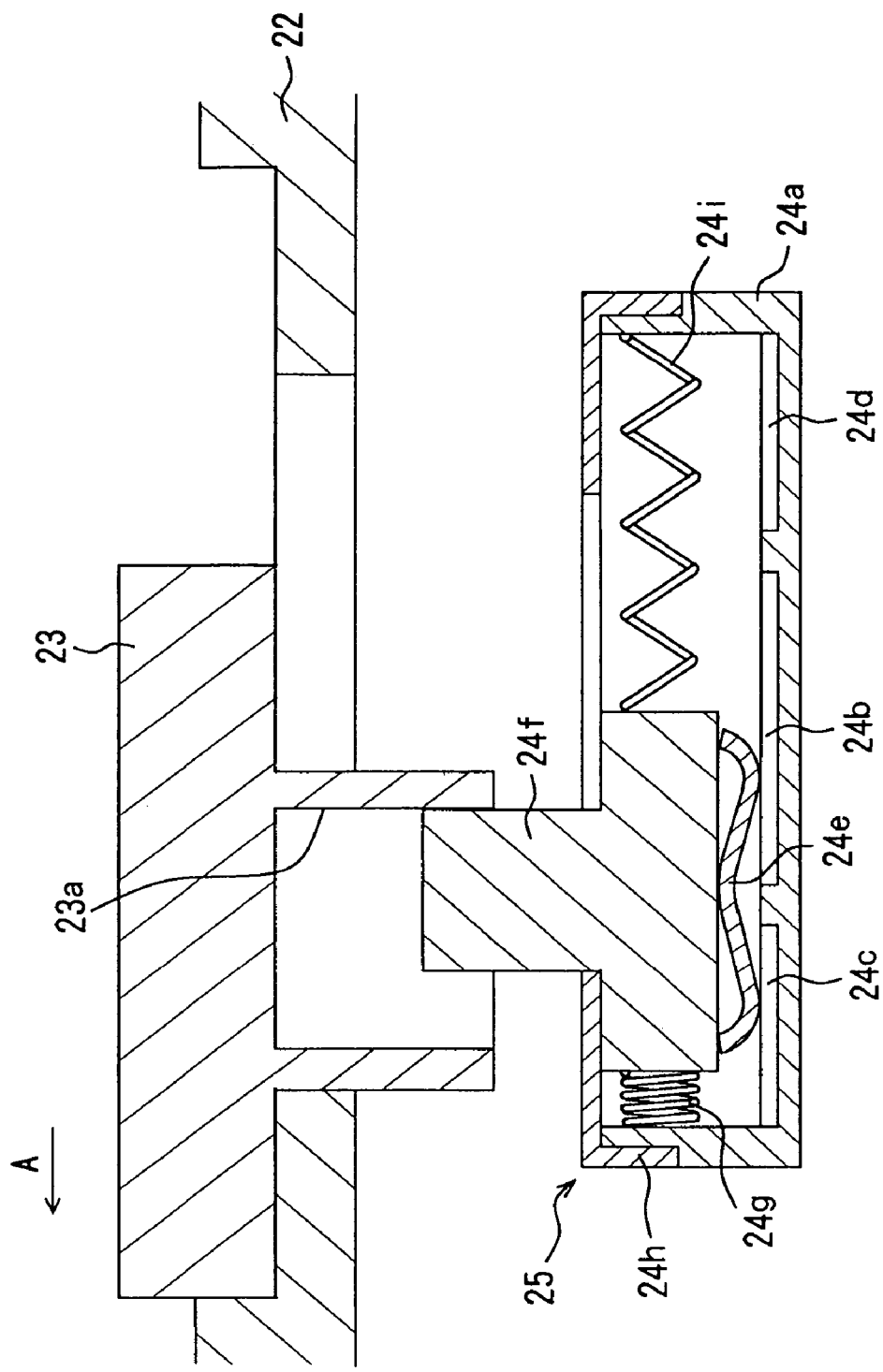
FIG. 12 shows the structure of the zoom switch of the conventional art.
Figure 13:
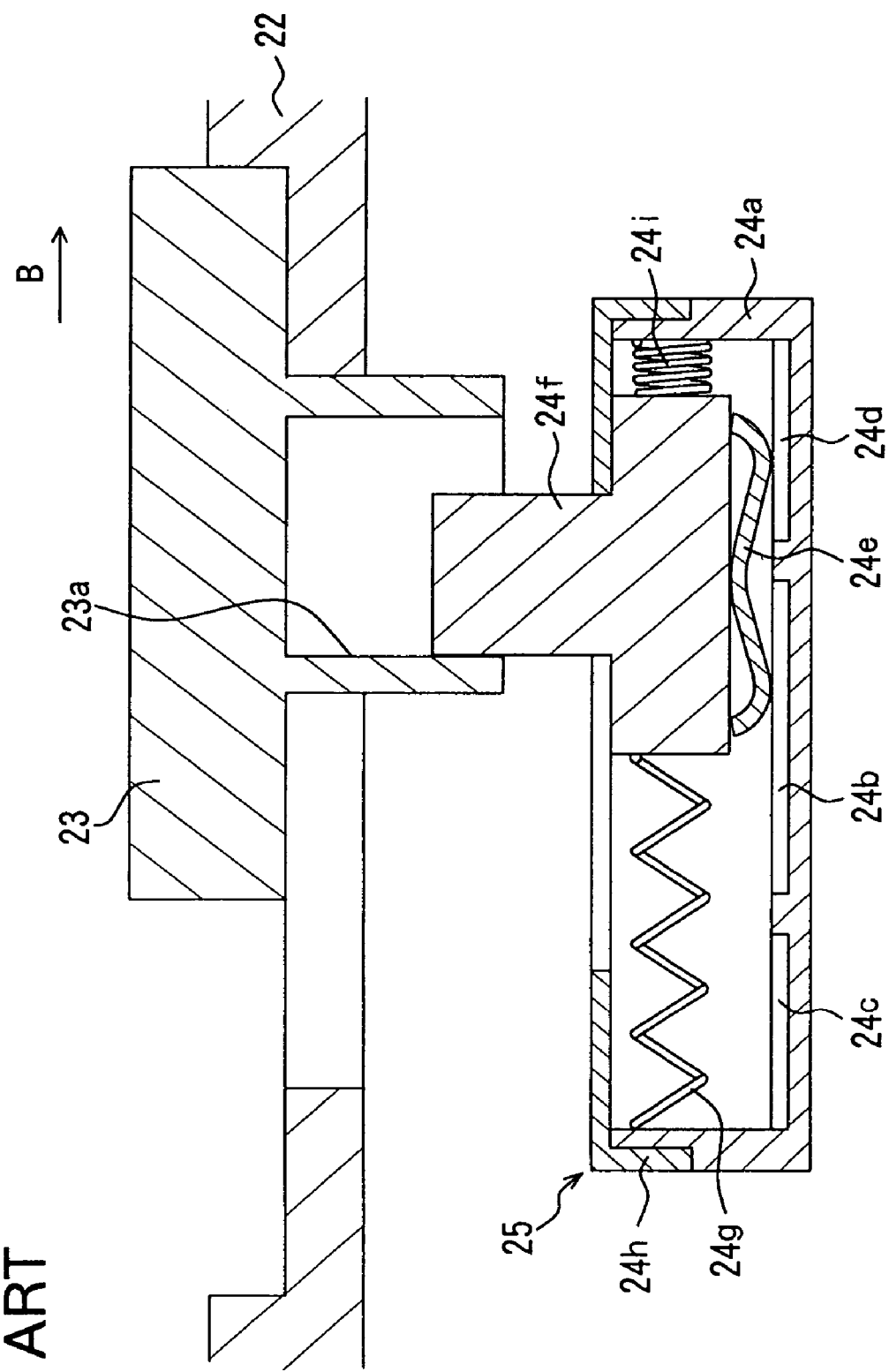
FIG. 13 shows the structure of the zoom switch of the conventional art.
Figure 14:
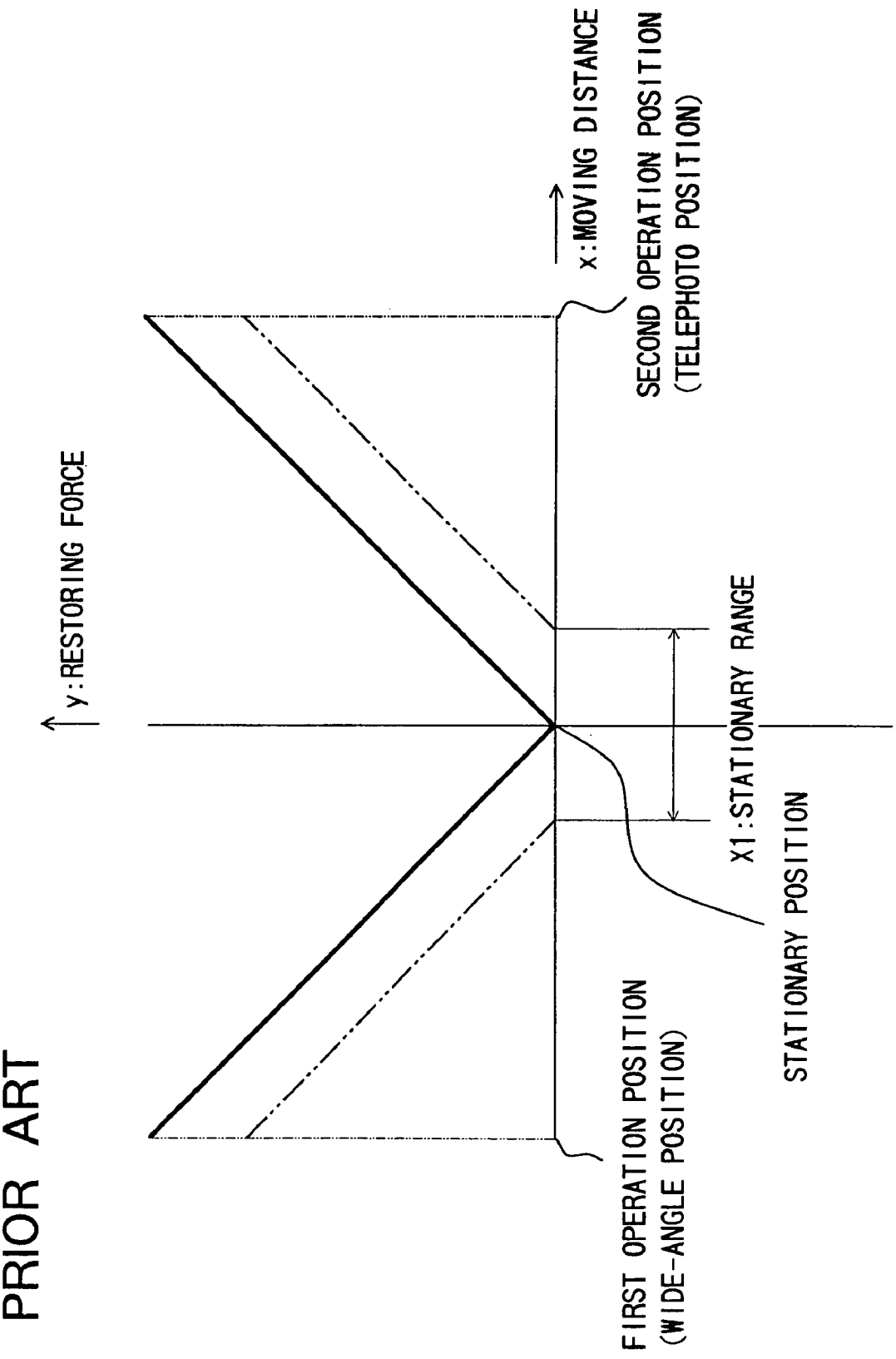
FIG. 14 is a diagram showing a variation curve of the restoring force of the zoom switch in the conventional art.

Here, the structure of the above described zoom switch unit 13 is similar to the structure of the switch unit 25 (see FIG. 11) described in the conventional art.

On the other hand, the structure of the release switch unit 14 is similar to the structure of a release switch used in a conventional camera. That is, the release switch unit 14 has a first switch (SW1) which turns ON by contacting the button leg 5a when the release button 5 is half depressed and a second switch (SW2) which turns ON by contacting the button leg 5a when the release button 5 is fully depressed.

Since the structure of the camera body 1 except the above described structure is similar to the structure used for a general camera, detailed explanations thereof will be omitted.

Then, the operation of the camera in this embodiment according to the operation of the zoom lever 4 will be explained.

In FIG. 1, the photographer holds the grip portion 2 by his/her right hand, points the lens barrel 3 at an object and operates the zoom lever 4 to set the image-taking angle of view. Here, when the zoom lever 4 is turned in one direction, the control circuit which is provided in the camera body 1 and receives an operation signal of the zoom lever 4, drives the lens barrel 3 in such a way that the image-taking angle of view is shifted to a wide-angle side. Furthermore, when the zoom lever 4 is turned in the other direction, the control circuit drives the lens barrel 3 in such a way that the image-taking angle of view is shifted to a telephoto side.

Thus, since the image-taking angle of view can be switched between the wide-angle side and telephoto side according to the operation direction of the zoom lever 4, it is easy to select the image-taking angle of view.

After the image-taking angle of view is decided, the image-taking operation is performed by pressing the release button 5 in the center of the zoom lever 4 (full depression operation). That is, when the button leg 5a of the release button 5 presses the second switch of the release switch unit 14, SW2 is turned ON and this ON signal is input to the control circuit in the camera body 1 through the flexible substrate 15. The control circuit which has received the input signal drives an image-pickup device provided in the camera body 1 for image-taking.

The camera in this embodiment is provided with a release button 5 close to the zoom lever 4 for changing the image-taking angle of view, and the photographer can thereby simply change the image-taking angle of view and carry out an image-taking operation with a single finger. Especially in an apparatus such as the digital camera which takes images while frequently changing the image-taking angle of view of the lens, excellent operability of the zoom lever 4 is required, and therefore adopting the above described structure makes the present invention preferably applicable to the above described apparatus.

Then, the operation of the zoom lever 4 will be explained in detail below.

First, when the zoom lever 4 is at the stationary position, as shown in FIG. 3, the arms 7b and 7c having spring properties contact the ribs 6d and 6e of the grip cover 6. In the condition shown in FIG. 3, the balance between both contact pressures to the ribs 6d and 6e of the arms 7b and 7c is kept even and the zoom lever 4 remains stable. This allows the zoom lever 4 to be kept at the stationary position without backlash.

The engagement portion 7a formed at the root ends of the arms 7b and 7c is positioned in such a way as to sandwich the protrusion of the knob member 13a in the zoom switch unit 13 (see FIG. 4).

Even if the stationary position of the knob member 13a fluctuates to a certain degree, the above described structure in this embodiment keeps the zoom lever 4 stably at the stationary position, making it possible to stop the knob member 13a at the stationary position accurately through the engagement portion 7a.

The zoom switch unit 13 has the two knob springs 13g and 13h, which makes the stationary position of the knob member 13a unstable as described in the aforementioned problem. However, connecting the zoom switch unit 13 to the zoom lever 4 having the structure of this embodiment through the plate 7 can stabilize the stationary position of the knob member 13a.

When the zoom lever 4 is located at the stationary position (position shown in FIG. 3) and at the same time the knob member 13a is at the stationary position, the sliding armature 13f contacts only the first terminal 13c as shown in FIG. 4 and there is no electrical connection with the second terminal 13d or the third terminal 13e.

At this time, the control circuit in the camera body 1 detects that the zoom lever 4 is at the stationary position on the basis of the signal from the zoom switch unit 13 and keeps the lens barrel 3 stopped.

Figure 5:
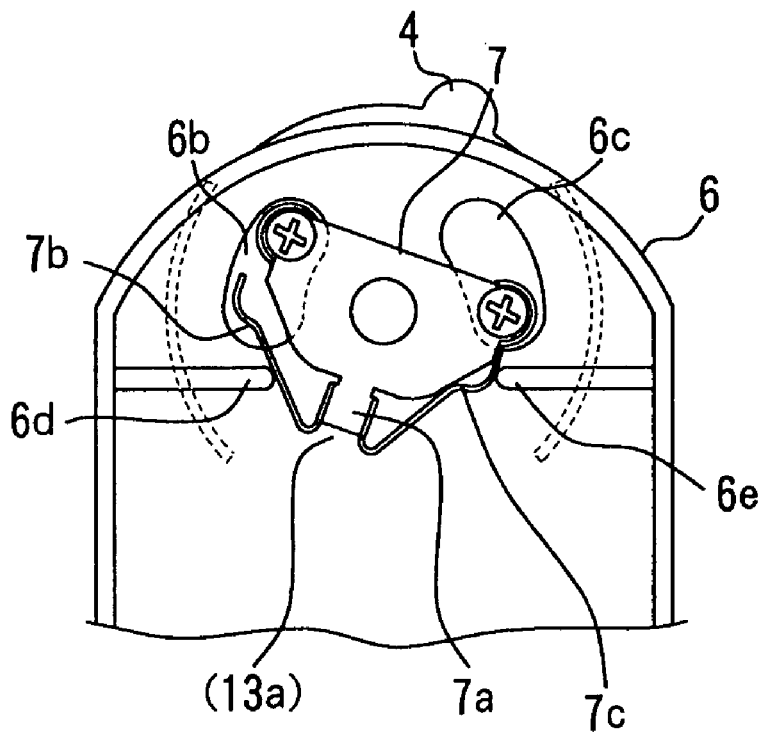
FIG. 5 is the rear view of the grip cover (wide-angle position)
Figure 6:
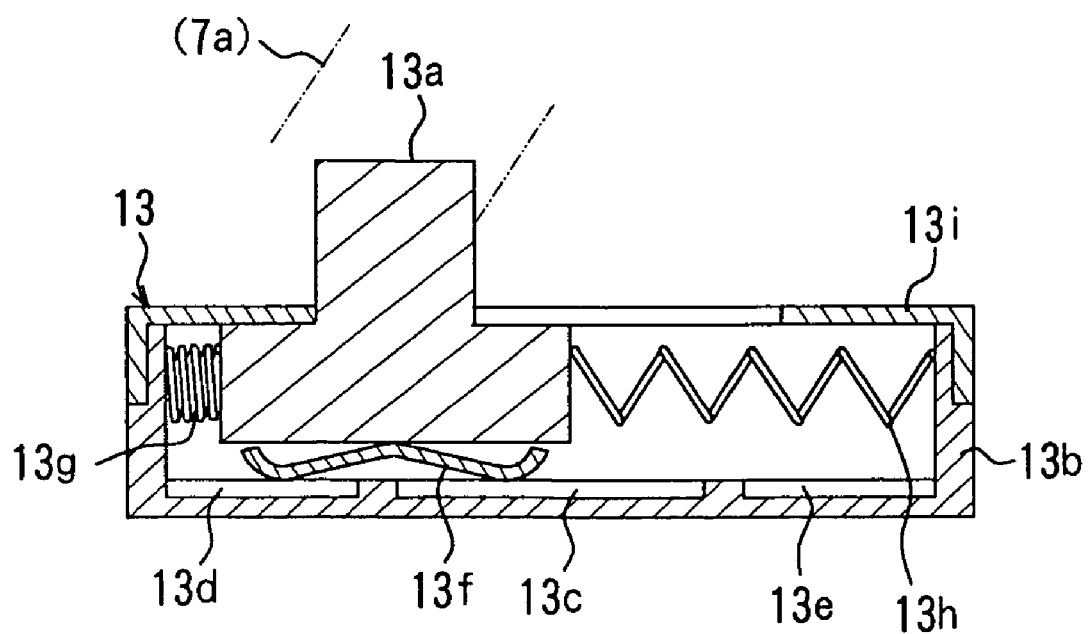
FIG. 6 shows the structure of the zoom switch (wide-angle position)

Here, when the operator turns the zoom lever 4 from the stationary position to the wide-angle position (turns clockwise in FIG. 3), as shown in FIG. 5, the plate 7 rotates together with the zoom lever 4, and therefore the engagement portion 7a also rotates and moves the knob member 13a from the stationary position to the wide-angle position shown in FIG. 6 against the spring force of the first knob spring 13g.

Through the rotation of the zoom lever 4, the engagement portion 7a operates describing an arc and the knob member 13a performs a linear motion within the plane including the operation track of the engagement portion 7a. This makes it possible to efficiently transmit the operation force of the zoom lever 4 to the knob member 13a without applying any extra lateral pressure, that is force acting in a direction different from the moving direction of the knob member 13a, to the knob member 13a, thus improving the operability of the zoom switch unit 13.

Furthermore, as described above, the width of the engagement portion 7a is set wider than the width of the protrusion of the knob member 13a by an appropriate distance providing certain play, and therefore the engagement portion 7a can move smoothly without getting snagged by the knob member 13a.

When the knob member 13a has moved to the wide-angle position, the sliding armature 13f contacts the first terminal 13c and second terminal 13d and electrically connects these terminals 13c and 13d. At this time, signal from the zoom switch unit 13 is input to the control circuit in the camera body 1, and the control circuit thereby detects that the zoom lever 4 is at the wide-angle position and drives the lens barrel 3 to change the image-taking angle of view to the wide-angle side.

In the condition shown in FIG. 6, the first knob spring 13g is compressed, and therefore a restoring force of restoring the original state occurs in the first knob spring 13g.

The photographer needs to turn the zoom lever 4 to keep the first knob spring 13g compressed while the lens barrel 3 is being driven to the wide-angle side. On the other hand, in this embodiment, the operation force of the zoom lever 4 is optimally adjusted by the operation of the arm 7c of the plate 7.

That is, as the plate 7 rotates from the stationary position in FIG. 3 to the wide-angle position in FIG. 5, the arm 7c contacts the rib 6e and becomes deflected, which produces a restoring force of restoring the zoom lever 4 to its stationary position.

Figure 7:
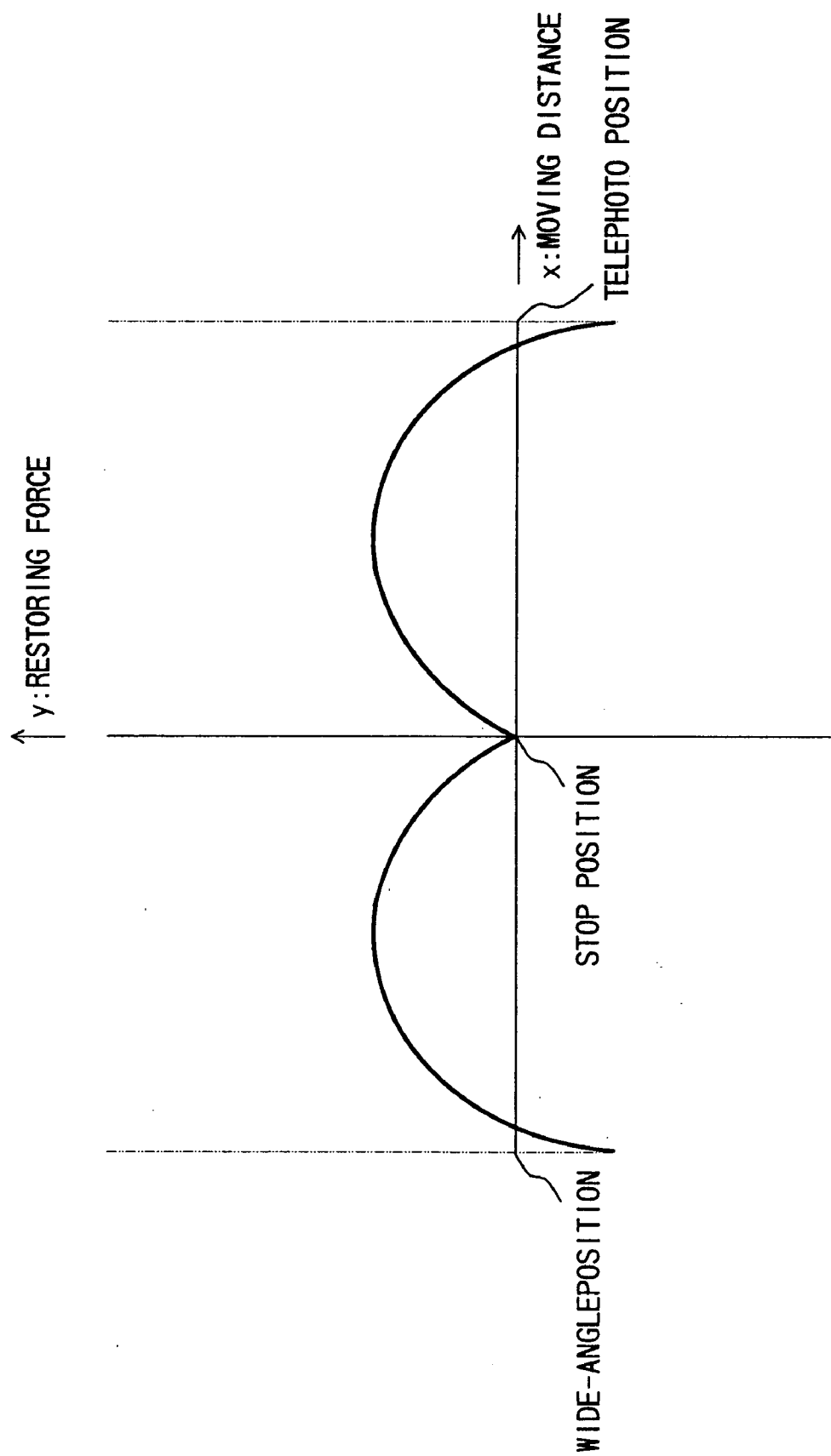
FIG. 7 is a diagram showing a variation curve of the restoring force of the zoom lever.
Figure 8:
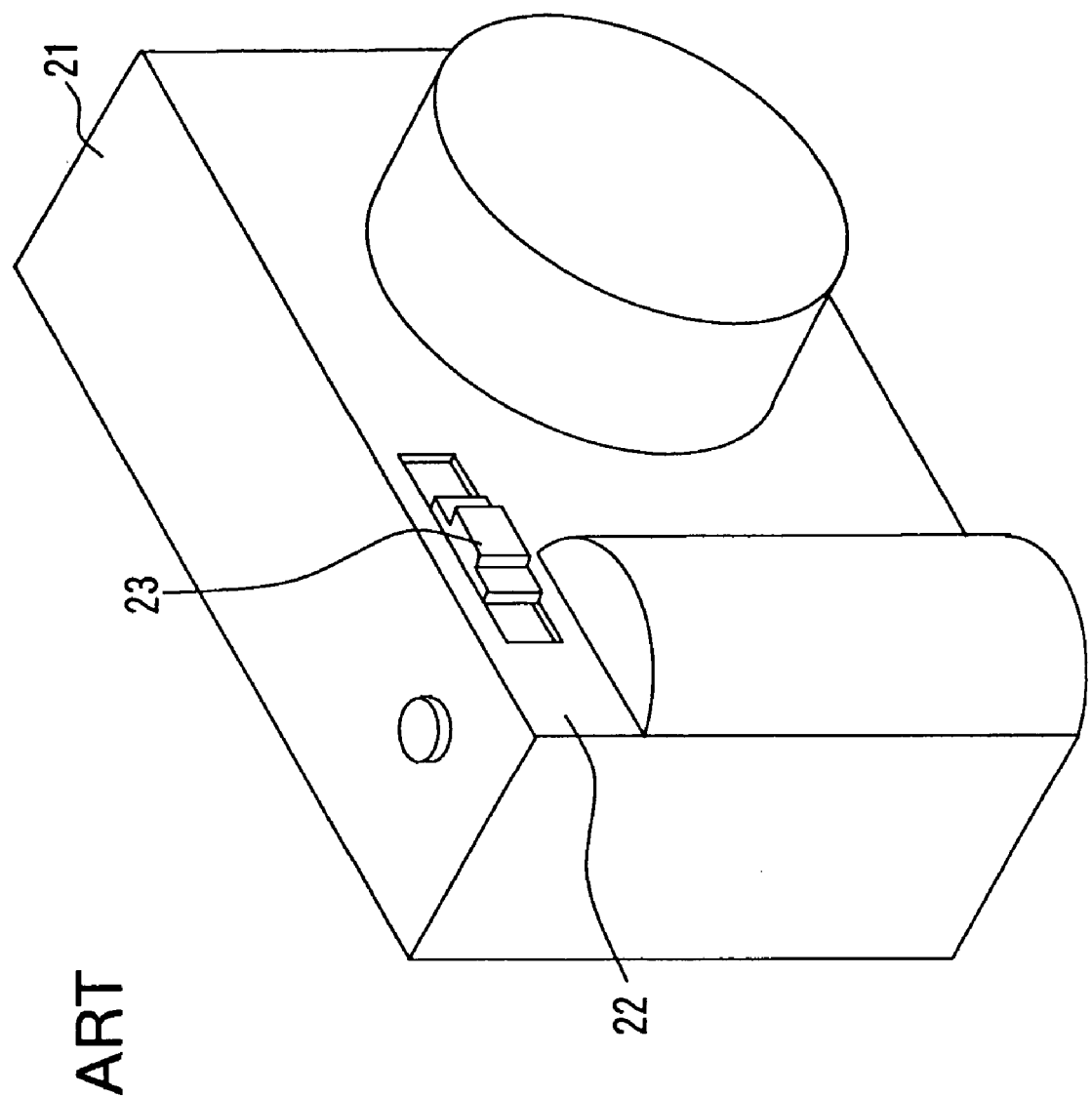
FIG. 8 is an external perspective view of a camera according to a conventional art.
Figure 9:
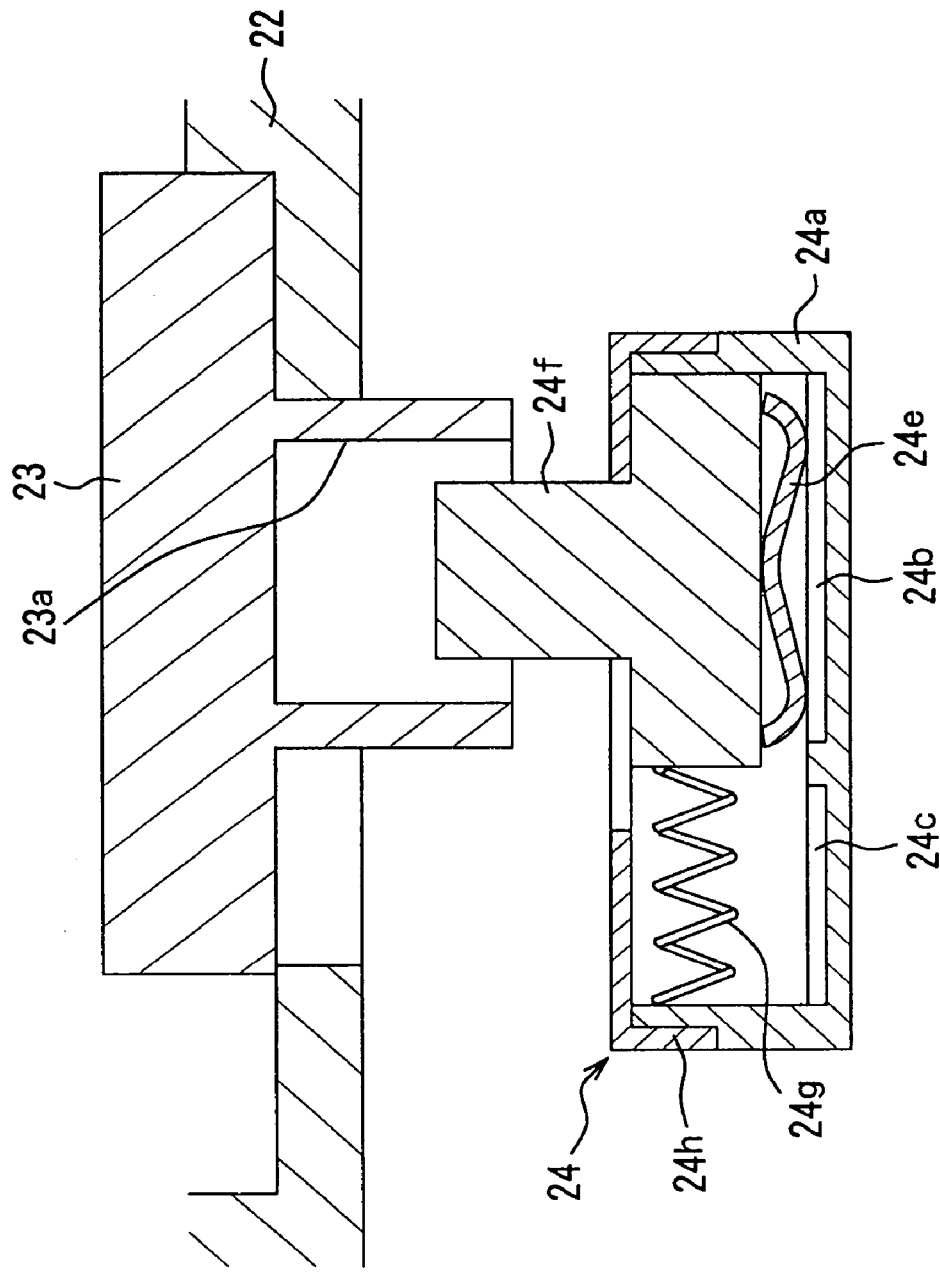
FIG. 9 shows a structure of the zoom switch of the conventional art.
Figure 10:
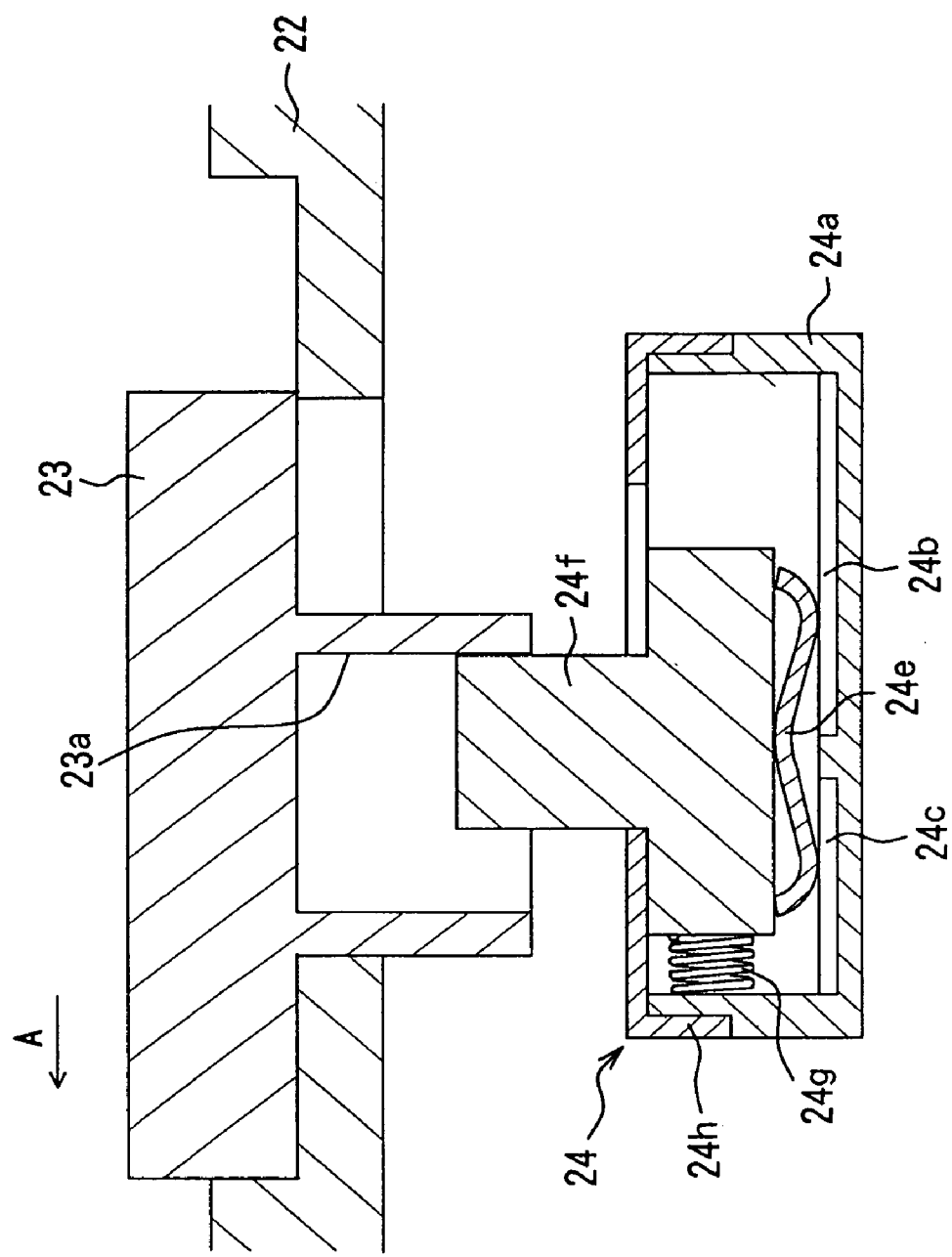
FIG. 10 shows the structure of the zoom switch of the conventional art.

The end of the arm 7c has a quasi-arc-shaped cross section in its longitudinal direction as shown in FIG. 3, etc. In the stage in which the zoom lever 4 starts to rotate from the stationary position, the amount of deformation of the arm 7c with respect to the amount of rotation of the zoom lever 4 increases as shown in FIG. 7. At this time, the zoom lever 4 receives a force in the direction back to the stationary position caused by the deformation of the arm 7c.

When the vertex of the arc-shaped portion of the arm 7c contacts the end of the rib 6e (reaches the vertex of the curve shown in FIG. 7) through the rotation of the zoom lever 4 toward the wide-angle side, the amount of deformation of the arm 7c decreases thereafter. At this time, the force of restoring the zoom lever 4 to the stationary position decreases as shown in FIG. 7.

Then, when the zoom lever 4 rotates up to a position close to the wide-angle position, the end of the arm 7c (arc-shaped portion) contacts the end of the rib 6e and is thereby held at this position, where a force of rotating the zoom lever 4 (plate 7) toward the wide-angle side is generated through the deformation of the arm 7c.

Since the above described force has the same direction in which the zoom lever 4 is turned to the wide-angle side (the user's operation force), it is possible to reduce the operation force required to move the zoom lever 4 against the spring force of the first knob spring 13g toward the wide-angle side. Especially when the zoom lever 4 is kept at the wide-angle position, this can be done with a smaller force.

Then, when the image-taking angle of view becomes a desired image-taking angle of view by driving the lens barrel 3, the photographer releases the zoom lever 4. Here, the restoring force of the first knob spring 13g being in the condition shown in FIG. 6 is set so as to be greater than the force of the plate 7 which moves the knob member 13a toward the wide-angle position due to the deformation of the arm 7c. Therefore, when the photographer releases the zoom lever 4, the zoom lever 4 receives the spring force of the first knob spring 13g through the knob member 13a and the plate 7 and thereby rotates toward the stationary position. At this time, the knob member 13a also moves to the stationary position.

When the knob member 13a reaches a point close to the stationary position, as described in the aforementioned problem, the first knob spring 13g may lose the restoring force due to the frictional force between the sliding armature 13f and terminals 13c and 13d, and the knob member 13a may stop just before the stationary position.

However, in this embodiment, when the knob member 13a reaches a point close to the stationary position, the end of the arm 7c has the curved surface and a click force (restoring force) of the arm 7c increases, and therefore the zoom lever 4 can return to the stationary position with the restoring force of the arm 7c and the knob member 13a can also return to the stationary position.

Then, when the zoom lever 4 returns to the stationary position, the arc-shaped portion of the arm 7b contacts the side face of the rib 6d and the zoom lever 4 is held by the arms 7b and 7c in a stable state. In this way, by allowing the zoom lever 4 and the knob member 13a to return to the stationary position precisely, it is possible to improve the quality and prevent careless misoperation of the camera.

The case where the zoom lever 4 is rotated toward the wide-angle position has been explained so far, but the same operation described above will also apply to the case where the zoom lever 4 is rotated forward the telephoto position which is opposite to the wide-angle position.

This embodiment has described the case of a digital camera, but the present invention is applicable to any electronic device which comprises at least a lever operated in different directions and has a structure in which different signals are output according to the operation position of the lever.

Furthermore, this embodiment has described the structure in which the knob member 13a is energized by the knob springs 13g and 13h from both directions, but the present invention is also applicable to a structure in which the knob member is energized by a spring from one direction.

According to this embodiment, the zoom lever 4 is energized by the arms 7b and 7c of the plate 7, and therefore it is possible to prevent backlash from occurring in the zoom lever 4 and hold the zoom lever 4 at the stationary position (position shown in FIG. 3) accurately. Moreover, by holding the zoom lever 4 at the stationary position, it is possible to hold the knob member 13a connected to the zoom lever 4 at the stationary position (position shown in FIG. 4) accurately.

While preferred embodiment has been described, it is to be understood that modification and variation of the present invention may be made without departing from scope of the following claims.

What is claimed is:

1. An electronic device comprising:
   a terminal;
   an armature which can contact the terminal;
   a knob member which moves between a first position and a second position, sliding the armature on the terminal;
   a first energizing member which energizes the knob member in the direction of the first position;
   a second energizing member which energizes the knob member in the direction of the second position;
   a rotation operation member which can move the knob member and can rotate between a third position corresponding to the first position and a fourth position corresponding to the second position; and
   a plate which has a first and a second arms with elastic deformation properties,
   wherein the first arm has an arc-shaped portion at end thereof and is elastic deformed to energize the rotation operation member in the direction of the third position when the rotation operation member is located close to the third position; and
   wherein the second arm has an arc-shaped portion at end thereof and is elastic deformed to energize the rotation operation member in the direction of the fourth position when the rotation operation member is located close to the fourth position.

2. The electronic device according to claim 1, wherein the first and the second arms of the plate give click force to the rotation operation of the rotation operation member.

3. The electronic device according to claim 1, wherein the first and the second arms of the plate are formed in such a way that the rate of increase of the energizing force to the rotation operation member is decreased according to the amount of rotation from an intermediate position between the third position and the fourth position of the rotation operation member.

4. The electronic device according to claim 1, wherein
   the rotation operation member has an engagement portion which engages with the knob member,
   the rotation operation member is placed in such a way that the moving track of the engagement portion and the moving track of the knob member are included in the same plane.

5. The electronic device according to claim 4, wherein a predetermined clearance is provided between the engagement portion and the knob member.

6. The electronic device according to claim 1,
   wherein the knob member receives the forces of the first energizing member and the second energizing member and is held at an intermediate position between the first and the second positions.

7. The electronic device according to claim 1, further comprising:
   a pressing operation member which is provided in the rotation center of the rotation operation member and subjected to a pressing operation; and
   a switch which can contact the pressing operation member,
   wherein the knob member is placed close to the switch;
   wherein the electronic device is a camera; and
   wherein the rotation operation member is a member to be operated to change the focal length of an image-taking optical system and the pressing operation member is a member to be operated to start an image-taking operation.

* * * * *